Patented Jan. 16, 1923.

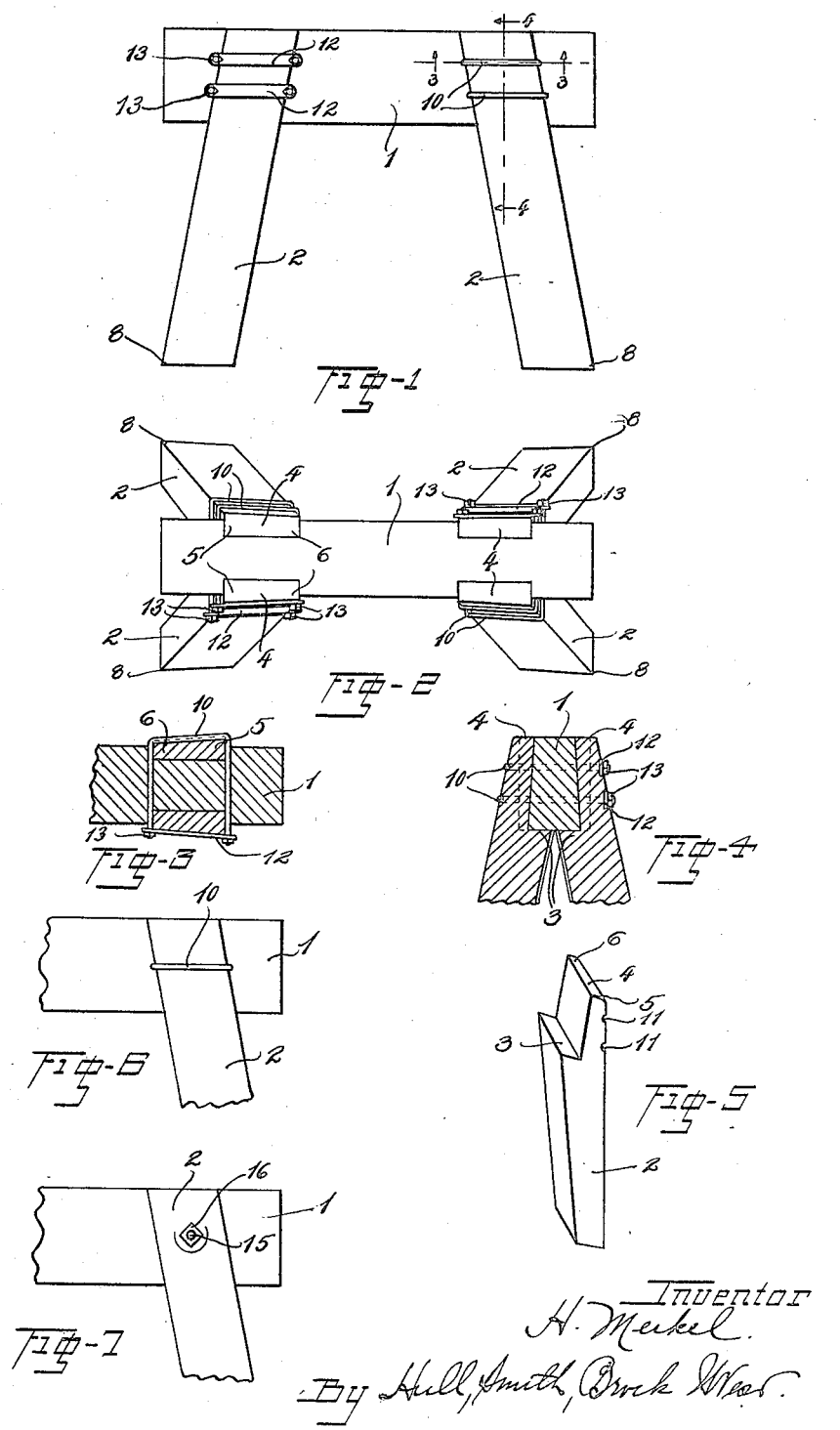

1,442,353

UNITED STATES PATENT OFFICE.

HENRY MERKEL, OF WEST MENTOR, OHIO.

TRESTLE.

Application filed December 26, 1919. Serial No. 347,594.

*To all whom it may concern:*

Be it known that I, HENRY MERKEL, a citizen of the United States, residing at West Mentor, in the county of Lake and State of Ohio, have invented a certain new and useful Improvement in Trestles, of which the following is a full, clear, and exact description, reference being had to the accompanying drawings.

This invention relates to trestles and has for its object to provide a trestle of great strength and consisting of few and simple parts which shall be easy to assemble and inexpensive to manufacture; to provide an improved manner of fitting the legs to the head of the trestle; to provide a trestle which can be quickly taken apart and conveniently stored or shipped, while further objects and advantages will appear as the description proceeds.

In the accompanying drawings wherein I have shown an illustrative embodiment of my invention, Fig. 1 is a side elevation of my trestle completely assembled; Fig. 2 is a top plan view thereof; Fig. 3 is a section taken on the line 3—3 of Fig. 1; Fig. 4 is a section taken on the line 4—4 of Fig. 1; Fig. 5 is a perspective view of one of the legs; and Figs. 6 and 7 are detail views showing modifications of the clamping arrangement.

Describing the various parts by reference numerals 1 indicates the horizontal bar or head which is recessed at opposite points adjacent each end to receive the interfitting recessed legs 2. The recesses in the bar are disposed at an angle so that the legs stand bracing each other as shown in Fig. 1. By referring to Fig. 4 it will be noted that these recesses are cut to a greater depth at the top of the bar than at the bottom which allows me to so recess the legs as to provide a maximum supporting shoulder 3 for a given spread of the legs and a given thickness at the top of each leg as indicated at 4. Each leg is preferably so recessed as to leave a thick top portion 5 at the forward side of the leg and a thinner portion 6 at the rear side of the leg. The effect of this construction is to throw the forward corner 8 of each leg to a maximum distance forward and outward from the horizontal bar 1, which further prevents the trestle from overturning sideways or endways.

Each pair of legs may be clamped to the horizontal bar by a pair of U-bolts 10—10 which are positioned in suitable recesses 11—11 on the outer face of one leg and extend through the horizontal bar and receive the face plates 12—12 inset in the face of the other leg. Suitable nuts 13—13 serve to clamp the parts together. When the horse is to be disassembled and stored or shipped, the nuts 13—13 need only to be slackened off sufficiently to disengage the U bolt and face plate from their respective recesses when the legs can be slipped from the recessed bar and the parts arranged in compact form. In Fig. 6 I have shown only one U bolt for each pair of legs which may be sufficient for the smaller trestles and in Fig. 7 I have shown the parts clamped together by a bolt 15 passing therethrough and provided with a nut 16 for drawing the parts together.

Having thus described my invention, what I claim is:—

A trestle comprising a horizontally disposed head portion having a recess on each side thereof adjacent each end, said recesses being of a greater depth at the top of said head than at the bottom thereof and the recesses at one end of said head defining an acute angle with the recesses at the opposite end, a leg adapted to be engaged in each of said recesses, each of said legs being recessed to define a shoulder to fit under and support said head, the recesses in said legs and head being so arranged as to cause a greater spread of each pair of legs along the edges adjacent the end of said body portion than the opposite edges, and means for detachably securing said legs to said head.

In testimony whereof, I hereunto affix my signature.

HENRY MERKEL.